Figure 1:
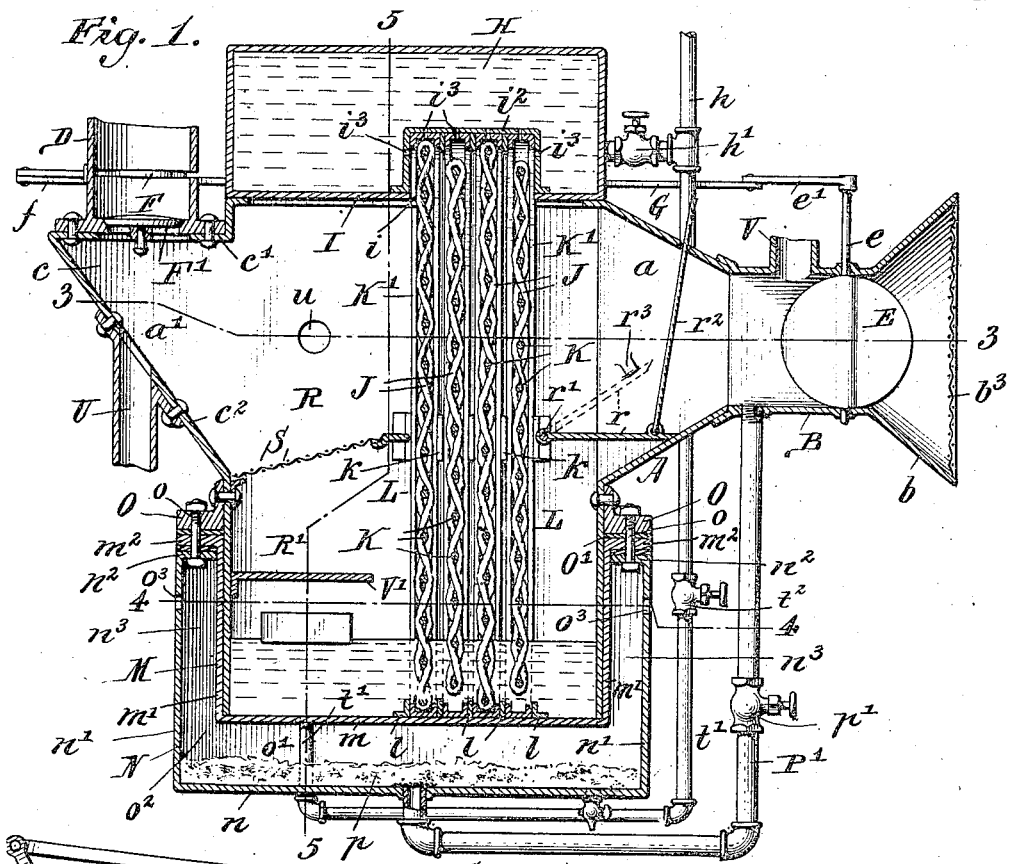

No. 843,554. PATENTED FEB. 5, 1907.
J. R. SCHRADER.
CARBURETER.
APPLICATION FILED SEPT. 27, 1905.

3 SHEETS—SHEET 1.

Witnesses:
Julius Lankes
Harry Harris

John R. Schrader,
Inventor.
By Emil Neuhard
Attorney.

No. 843,554. PATENTED FEB. 5, 1907.
J. R. SCHRADER.
CARBURETER.
APPLICATION FILED SEPT. 27, 1905.

3 SHEETS—SHEET 2.

Witnesses:
Julius Lankes
Harry Harris

John R. Schrader, Inventor.
By Emil Neuhart
Attorney.

No. 843,554. PATENTED FEB. 5, 1907.
J. R. SCHRADER.
CARBURETER.
APPLICATION FILED SEPT. 27, 1905.

3 SHEETS—SHEET 3.

Witnesses:
Julius Lawler
Harry Harris

John R. Schrader, Inventor.
By Emil Neubark
Attorney.

UNITED STATES PATENT OFFICE.

JOHN R. SCHRADER, OF BUFFALO, NEW YORK, ASSIGNOR, BY DIRECT AND MESNE ASSIGNMENTS, TO BUFFALO GAS GENERATOR AND MANUFACTURING COMPANY, A CORPORATION OF NEW YORK.

CARBURETER.

No. 843,554.     Specification of Letters Patent.     Patented Feb. 5, 1907.

Application filed September 27, 1905. Serial No. 280,297.

*To all whom it may concern:*

Be it known that I, JOHN R. SCHRADER, a citizen of the United States, residing at Buffalo, in the county of Erie and State of New York, have invented certain new and useful Improvements in Carbureters, of which the following is a specification.

My invention relates to improvements in carbureters, and its primary object is to provide an automatic feed for saturating absorbent material, and by means of suction charge the air with hydrocarbon vapors released from said absorbent material.

Other objects are to interpose an absorbent body between the air-inlet and gas-outlet of the casing and cause air by means of suction applied to the said outlet to be drawn into the casing through the saturated body and out through the outlet in the form of gas for storage or consumption; to provide an absorbent body in the course of the air passing through the carbureter and maintain said absorbent body in a saturated condition by capillary attraction or otherwise, and also to provided a series of absorbent bodies which are removably located in the path of the air passing through the carbureter.

Still further objects are to provide the air-inlet and gas-outlet with valves, connected so that they may be regulated in unison; to provide the carbureter with a heating-chamber at the lower end to maintain the liquid hydrocarbon at a certain temperature in order to prevent sweating on the bottom of the carbureting-chamber; to provide said heating-chamber with suitable absorbent material adapted to absorb the drippings from the bottom of the carbureting-chamber in the event of the necessary heat being unobtainable to prevent sweating; to provide means for drawing a quantity of fresh air into the carbureting-chamber, so as to mingle with the carbureted air, and to otherwise improve on carbureters now in use.

With these and other objects in view the invention consists in the construction, arrangement, and combination of parts to be hereinafter described, and particularly pointed out in the subjoined claims.

Figure 2:
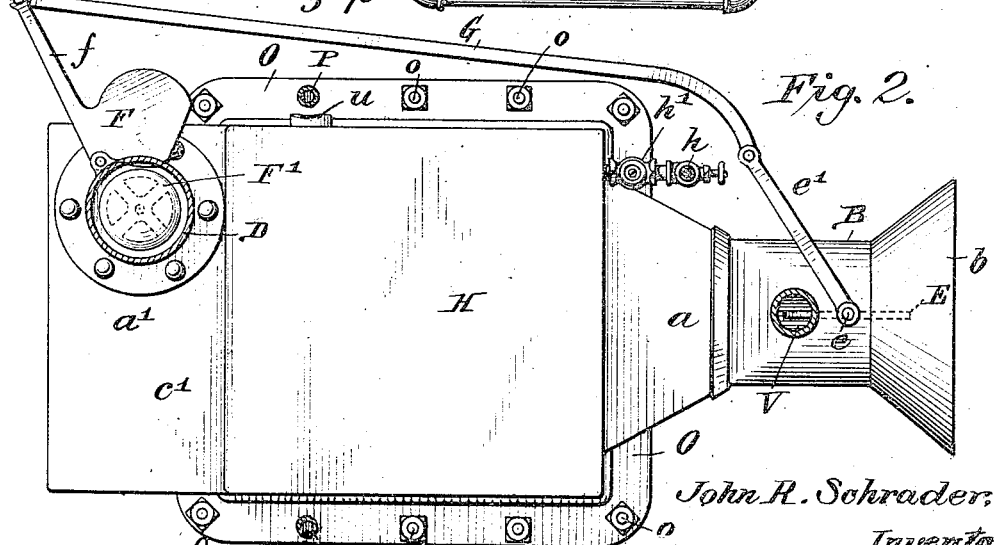
Figure 3:
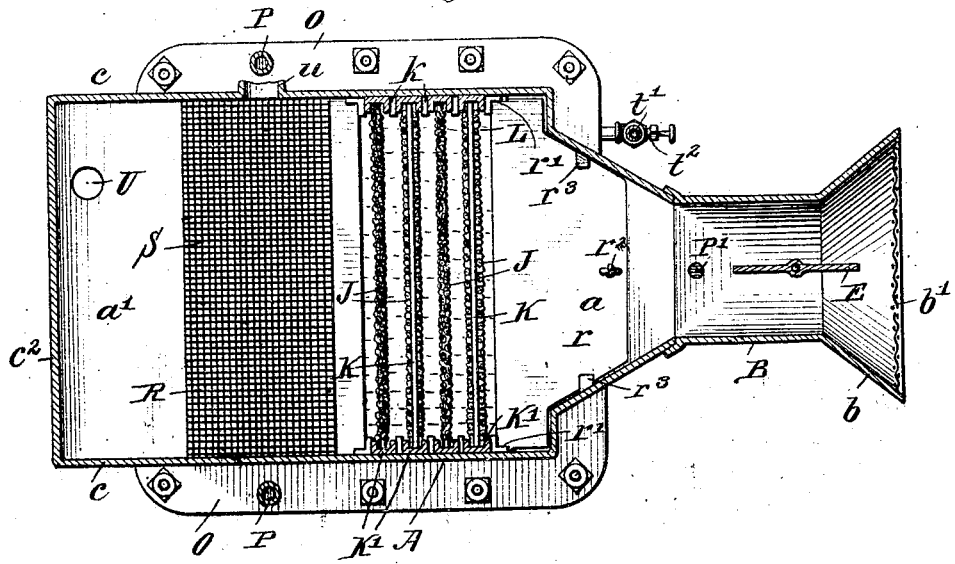
Figure 4:
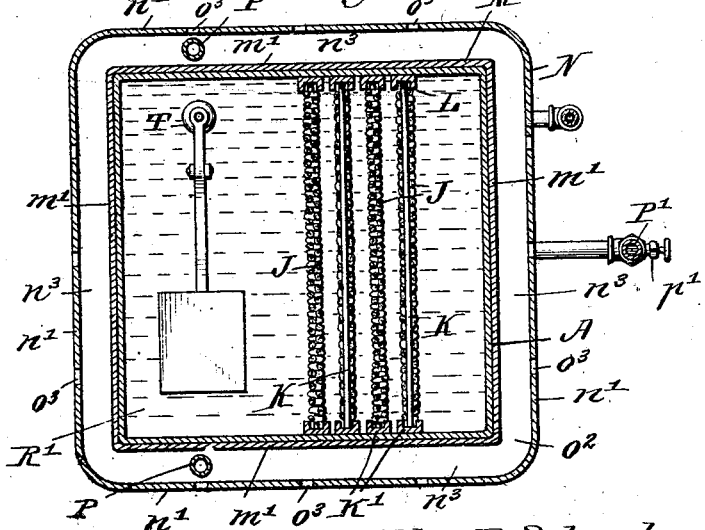
Figure 5:
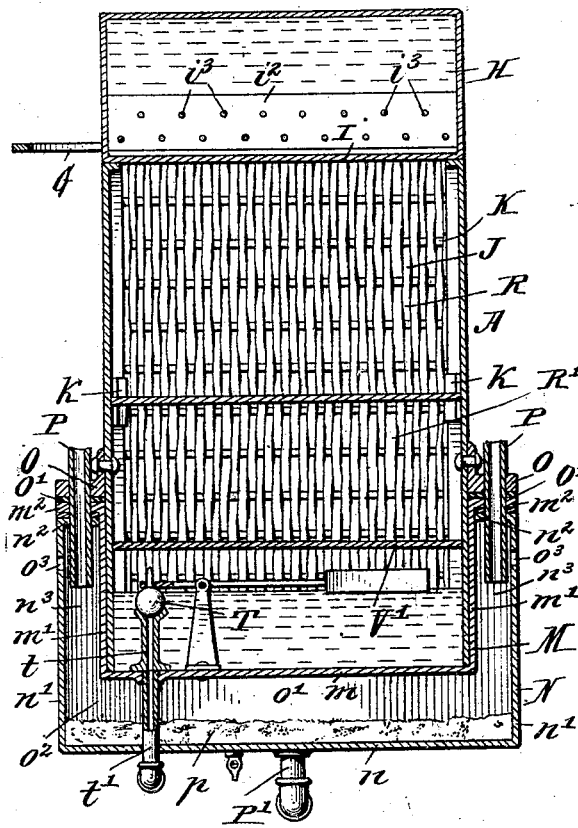
Figure 6:
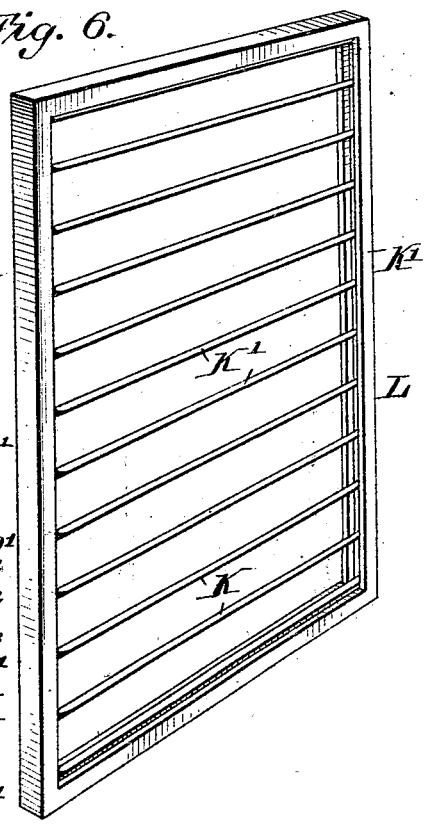
Figure 7:
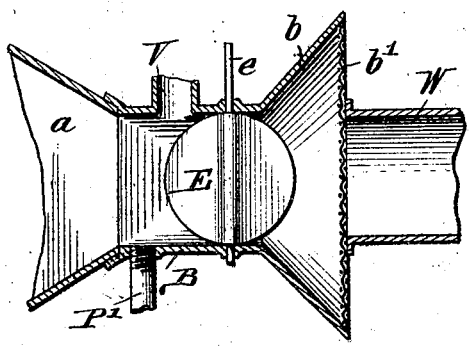

In the drawings, Figure 1 is a central vertical section through a carbureter embodying my invention. Fig. 2 is a plan view of the same. Fig. 3 is a horizontal section taken on line 3 3, Fig. 1. Fig. 4 is a horizontal section taken on line 4 4, Fig. 1. Fig. 5 is a transverse section taken on line 5 5, Fig. 1. Fig. 6 is a detached perspective view of one of the removable racks, to which the liquid-absorbing material is applied. Fig. 7 is a horizontal section of the air-inlet showing an air-draft pipe applied thereto to aid the suction apparatus in creating the desired air-current.

Referring to the drawings in detail, like letters of reference refer to like parts in the several figures.

The letter A designates the carbureter-casing, which may be of any size or shape, but which is herein shown as of rectangular formation and provided with opposite end extensions $a$ and $a'$. The extension $a$ is tapered outward and has secured thereto an air-inlet pipe B, which terminates in a funnel $b$, having its outer or wide end provided with a screen $b'$ to exclude paper or particles of foreign matter held in suspension in the air, or drawn to the inlet by the suction applied to the carbureter. The extension $a'$ extends, by preference, the full width of the carbureter casing proper, as shown in Fig. 2, and consists of the end walls $c$, which form a continuation of the sides of the casing, a horizontal upper wall $c'$ and an inclined wall $c^2$ extending from the upper wall to the adjacent end wall of said casing. To the upper wall of said extension a gas-outlet pipe D is secured, which leads to a compressor or to the combustion-chamber of an engine. When connected to an engine, the outward stroke of the piston thereof creates the necessary suction to cause the air to be drawn into the inlet $a$ through the carbureter and to the combustion-chamber of the engine through outlet-pipe D.

In the inlet-pipe is a butterfly-valve E, having its pivot-stem $e$ projecting from the pipe and provided with a lever $e'$, and in the outlet-pipe D a slide-valve F is secured, which is provided with an outstanding arm $f$. A connecting-rod G has opposite ends secured to the arm $f$ of said slide-valve and to lever $e'$ of the butterfly-valve, respectively, its function being to cause both valves to act in unison. An inwardly-closing check-valve F' is also located in the outlet-pipe to prevent back pressure on the compression-stroke of the engine or compressor, as the case may be.

Surmounting the carbureting-casing is a gasolene or other liquid-hydrocarbon receptacle H, having a suitable supply-pipe $h$ fitted with a valve $h'$ to govern the supply of gasolene thereto. Said receptacle has its bottom I provided with an opening $i$, which is covered by a hood or upwardly-extending housing $i^2$, perforated, as at $i^3$, for a purpose to be hereinafter described.

In the carbureting-chamber between the air-inlet and the gas-outlet I arrange a suitable fluid-absorbing body or bodies, which in a representative form are shown herein as absorbent cord or wicking J, entwined around cross bars or wires K, disposed horizontally in a frame K', said frames and bars constituting suitable racks L for the absorbent material. These racks are removable, and the upper ends thereof are held in the hood $i^2$, extending into the liquid-receptacle, the sides thereof being guided by lugs $k$, extending from the sides of the casing. In applying the absorbent cord or wicking one end of each cord is suitably secured to the end of the uppermost wire K, then passed over the successive wires on opposite sides in zigzag course to the lowermost wire, thence upward in the same manner to the uppermost wire, continuing in this manner back and forth until the entire rack is covered, as shown in Fig. 5.

The liquid hydrocarbon in the chamber H is fed to the absorbent material J through the apertures $i^3$ in the hood $i^2$ and flows down in the course of the air, which is drawn through the saturated material and thoroughly carbureted.

The casing is provided with a box-like bottom M, which is removable to permit the introduction of the racks L, the lower ends of the latter being held between guides $l$, secured to the bottom. Said bottom consists of a bottom wall $m$ and vertical walls $m'$, that lie against the sides of the casing proper and have outstanding flanges $m^2$ at their upper ends. Surrounding the lower end of the carbureting-casing is a casing N, having a bottom $n$ and side walls $n'$, terminating in inwardly-directed flanges $n^2$, the side walls being separated from the carbureting-casing by intervening spaces $n^3$. Flanges O are riveted or otherwise secured to the sides of the carbureting-casing, and passing through the same and the flanges $m^2$ and $n^2$, respectively, of the bottom and the casing N are bolts $o$, which secure the three parts together. Between flanges O and $m^2$ a suitable packing O' is clamped.

The bottom of the casing N is separated from the carbureting-casing by an intervening space $o'$, which, with the side spaces $n^3$, form a heating-chamber $o^2$, having the sides thereof provided with apertures $o^3$ for the introduction of atmospheric air. Said chamber is provided with pipes P, which may lead to the exhaust of the engine in order to introduce warm air to the chamber and prevent sweating on the bottom $m$. Warm air may, however, be provided from any other source. As it may be necessary at times to shut off the pipes P, I place within said heating-chamber, suitable absorbent material $p$ to absorb the water of condensation formed on the bottom as it drips therefrom. Connecting the heating-chamber with the inlet B is a pipe P', having a valve $p'$. The warm air in the heating-chamber is therefore drawn into the carbureter and mixed with the air drawn into the funnel $b$. The two air-currents are then drawn through the absorbent material in a mixed state and thoroughly carbureted.

The carbureting-casing is divided into two chambers R and R', separated by a valve $r$ and a screen S. Said valve is pivotally affixed at $r'$ and extends into the extension $a$ of the casing. Affixed thereto is a cord $r^2$ or other suitable device, which is passed through the wall of the casing to render the valve easily operative, the latter being limited in its upward or opening movement by lugs $r^3$, extending from the sides of the extension $a$ and serving as stops. It is apparent from the foregoing that the racks L, carrying the absorbent material, are located between valve $r$ and screen S and that they extend from top to bottom of the carbureting-casing. The latter is provided with a quantity of gasolene or other liquid hydrocarbon which is preferably maintained at a constant level by a float-controlled valve T, adapted to open and close the outlet of a tube $t$, secured to the bottom and held in communication with the liquid-supply pipe $t'$, branching from pipe $h$ and having a valve $t^2$ to regulate or close the supply. The lower ends of the racks L, which carry the absorbent material, are immersed in the liquid hydrocarbon, which is drawn upward by capillary attraction in the course of the air.

An air-inlet U is provided and arranged, preferably, beneath the gas-outlet and in line therewith. When the carbureted air is drawn through the gas-outlet by suction, atmospheric air is drawn through the inlet U and in its course to the engine or compressor, as the case may be, is intimately mixed with the gas or carbureted air.

The structure herein shown is particularly adapted for automobile purposes, and the outlet-pipe D is designed to lead to the combustion-chamber of the engine. Provision may also be made to store a quantity of the gas by connecting to the carbureting-chamber a pipe $u$, which may be led to a compressor. The stored gas may be used for starting the engine, after which the supply may be drawn directly from the carbureter. A pipe V may be connected to the inlet B for the direct introduction of warm air without first leading the air through the heating-chamber.

In starting an engine or compressor, as the case may be, the suction created causes the air to be drawn into the inlet $a$ through the saturated absorbent body and out through the outlet, for consumption. A richer, drier, and greater yield of gas is obtained from a given quantity of liquid hydrocarbon by means of suction applied to bring atmospheric air in contact with the liquid than is possible by a forced draft or by the use of compressed air. Moreover, the tank for compressed air is dispensed with, as is also the compressor, when the carbureter is connected with an engine. When a large supply of gas is needed, the valve $r$ is elevated to the position shown in dotted lines, Fig. 1, which permits a portion of the air to be drawn into the lower chamber R', through the lower portion of the absorbent material, thence up through the screen S, and finally out through the gas-outlet D, with the gas generated in the upper chamber.

To prevent the liquid in the bottom of the casing from being vaporized directly without first being absorbed by the absorbent body, a baffle-plate V' is located beneath the screen S.

As shown in Fig. 7, the exhaust W of a fan, compressor, or other current-inducing means may be secured to the air-inlet of the carbureter to create a forced current of air. This may be desirable where it is necessary to increase the yield of gas or when the suction applied is too weak, in which latter case the forced current serves as an aid to the suction.

This invention is susceptible to many changes in form, construction, arrangement, and combination of parts without departing from the spirit thereof or sacrificing any of its advantages.

Having thus described my invention, what I claim is—

1. A carbureter comprising a casing open at its lower end and having an air-inlet, a gas-outlet, and outstanding flanges secured to the walls thereof, a removable bottom having upstanding walls provided with an outstanding flange, a suitable packing between the flanges on said casing and the bottom, a casing surrounding the upstanding walls of said removable bottom and being separated from said removable bottom by an intervening space, said last-mentioned casing having inwardly-directed flanges, bolts passing through said flanges to secure the parts together, and means for carbureting the air within said casing.

2. In a carbureter, the combination of a casing having an air-inlet and a gas-outlet, an absorbent material located in said casing between said inlet and outlet, a pivoted valve extending from said absorbent material to the wall of the casing, and a screen extending from said absorbent material to the opposite wall of the casing, means for manipulating said valve to permit the air to pass through the absorbent material below the valve as well as above the same, and a fluid-supply to saturate the absorbent material with liquid hydrocarbon.

3. In a carbureter, the combination of a casing having an air-inlet and a gas-outlet, an absorbent material located in said casing between said inlet and outlet, a wall dividing said casing into two chambers and consisting of a screen on one side of the absorbent material and a pivoted valve on the other side thereof, the lower chamber having a supply of liquid hydrocarbon into which the lower end of the absorbent material is held, and a baffle-plate between said liquid and the screen.

4. In a carbureter, the combination with a carbureter-casing having an air-inlet and a gas-outlet, said casing being open at its lower end and provided with outstanding flanges at the sides thereof, a removable bottom for said casing having outstanding flanges at its upper end situated beneath the flanges on the casing, a casing surrounding said removable bottom and separated therefrom by an intervening space, an air-pipe connecting said last-mentioned casing with the inlet of the carbureter-casing, the casing surrounding said removable bottom having inwardly-directed flanges at its upper end situated beneath the above-mentioned flanges, bolts for securing said flanges together, and means within the carbureter-casing for carbureting the air passing therethrough.

5. In a carbureter, the combination of a casing having an air-inlet and a gas-outlet, a valve in said inlet and a valve in said outlet, connections between said valves to cause them to move in unison, a series of absorbent bodies located in the casing, means for directing the air through the upper portion of the absorbent bodies only or through the entire length of said bodies, and an air-pipe entering the casing near the gas-outlet thereof to cause the current of air to be drawn into the outlet with the carbureted air.

6. In a carbureter, the combination of a casing having an air-inlet and a gas-outlet and containing a quantity of liquid hydrocarbon, a superposed liquid-hydrocarbon receptacle having an opening in its bottom and a perforated hood closing said opening, and removable racks having absorbent material thereon and having their upper ends extending into said hood and the lower ends immersed in the liquid hydrocarbon contained in said casing.

7. In a carbureter, the combination of a casing having an air-inlet and a gas-outlet and containing a quantity of liquid hydrocarbon, a superposed liquid-hydrocarbon receptacle having an opening in its bottom and a perforated hood closing said opening, removable racks having absorbent material thereon and having their upper ends extending into said hood and the lower ends immersed in the liquid hydrocarbon contained in said casing, a valve in the air-inlet, a valve in the gas-outlet, mechanism between said valves to cause the same to act in unison, and a check-valve between said valve in the outlet and the interior of the casing.

In testimony whereof I have affixed my signature in the presence of two subscribing witnesses.

JOHN R. SCHRADER.

Witnesses:
PHILIP GERST,
EMIL NEUHART.